United States Patent Office 3,611,785
Patented Oct. 12, 1971

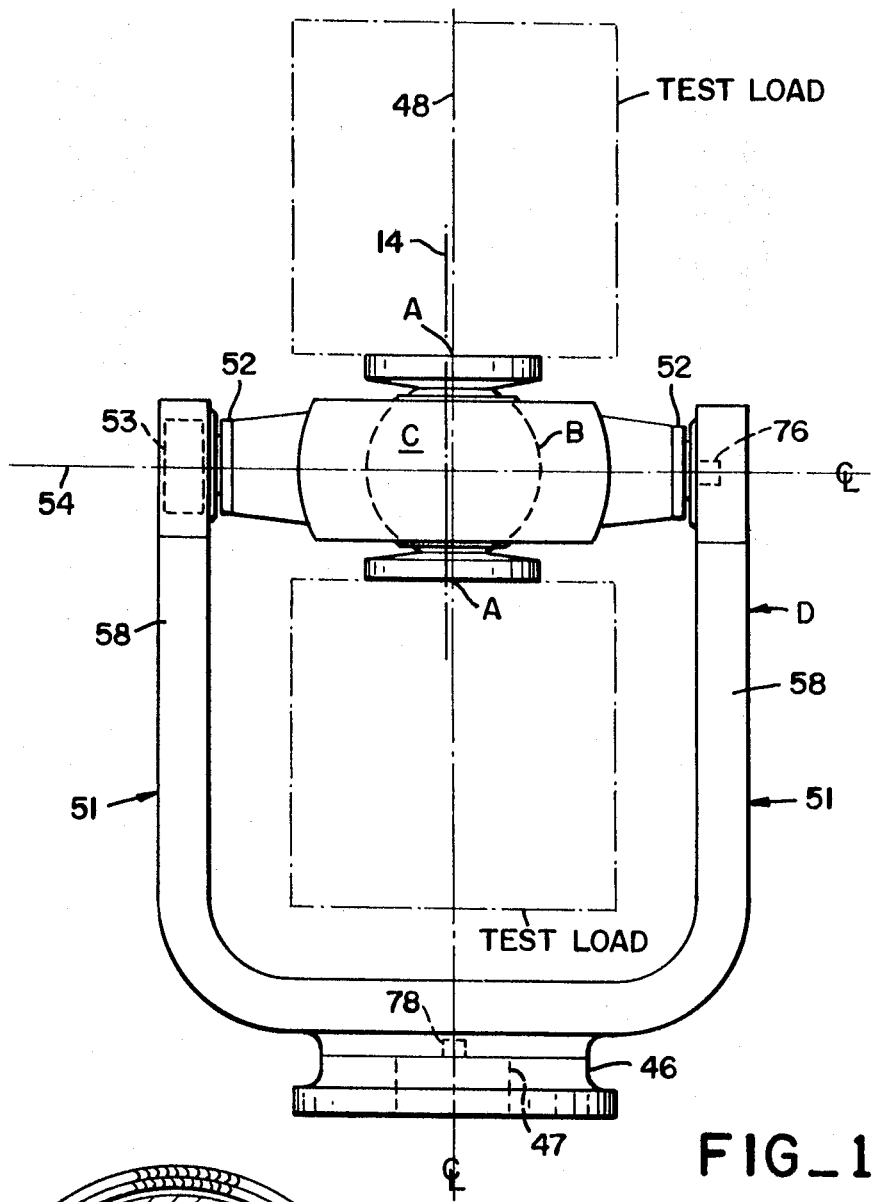
FIG_1
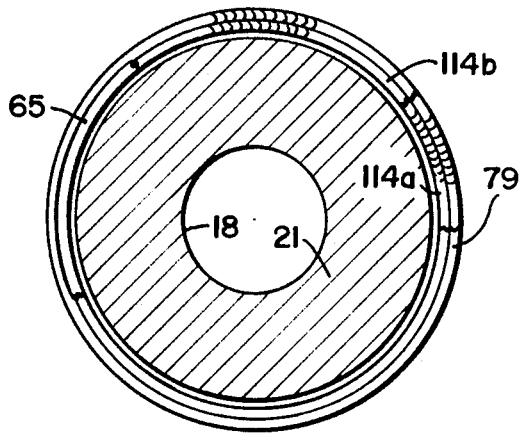
FIG_5

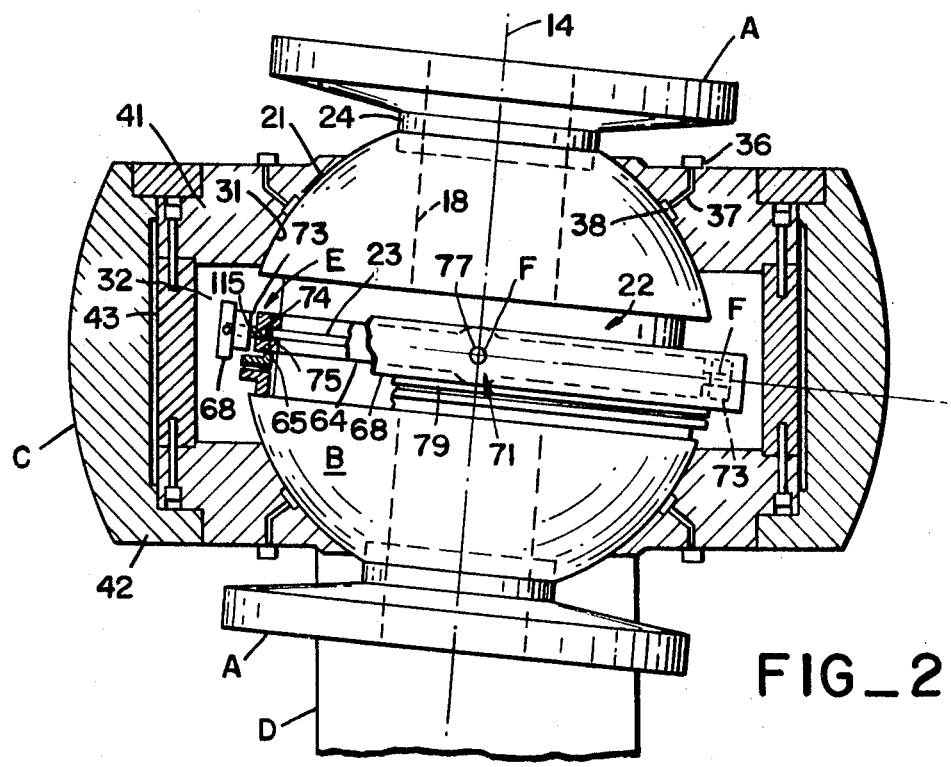
FIG_2
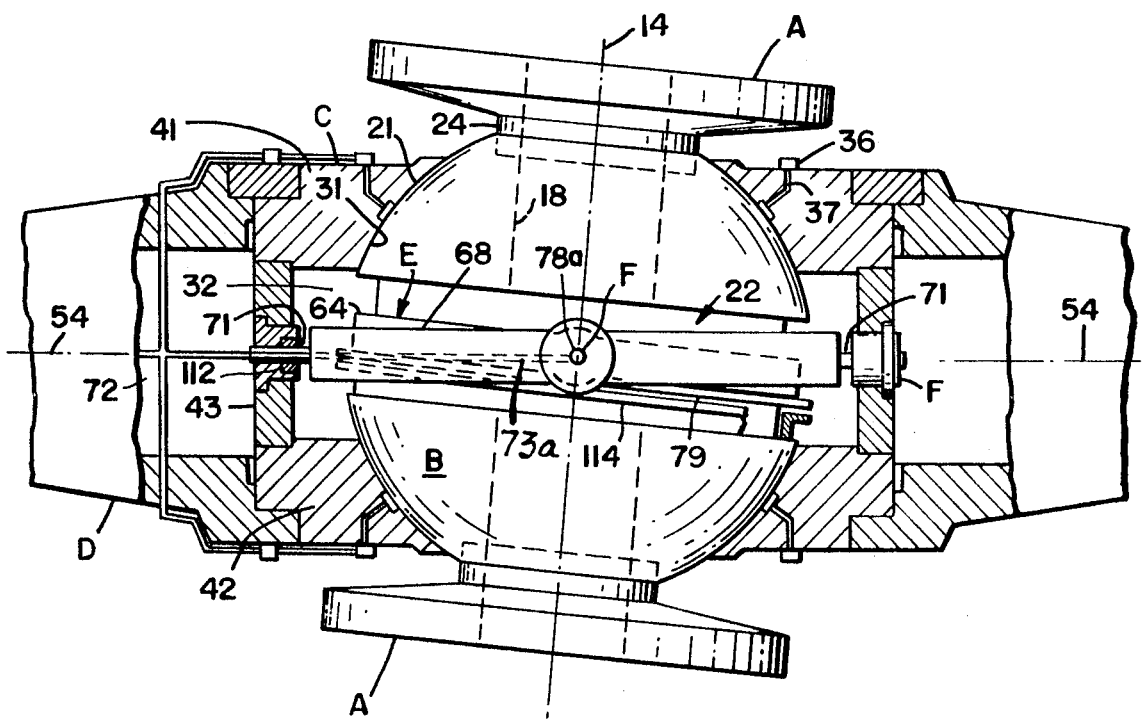
FIG_3

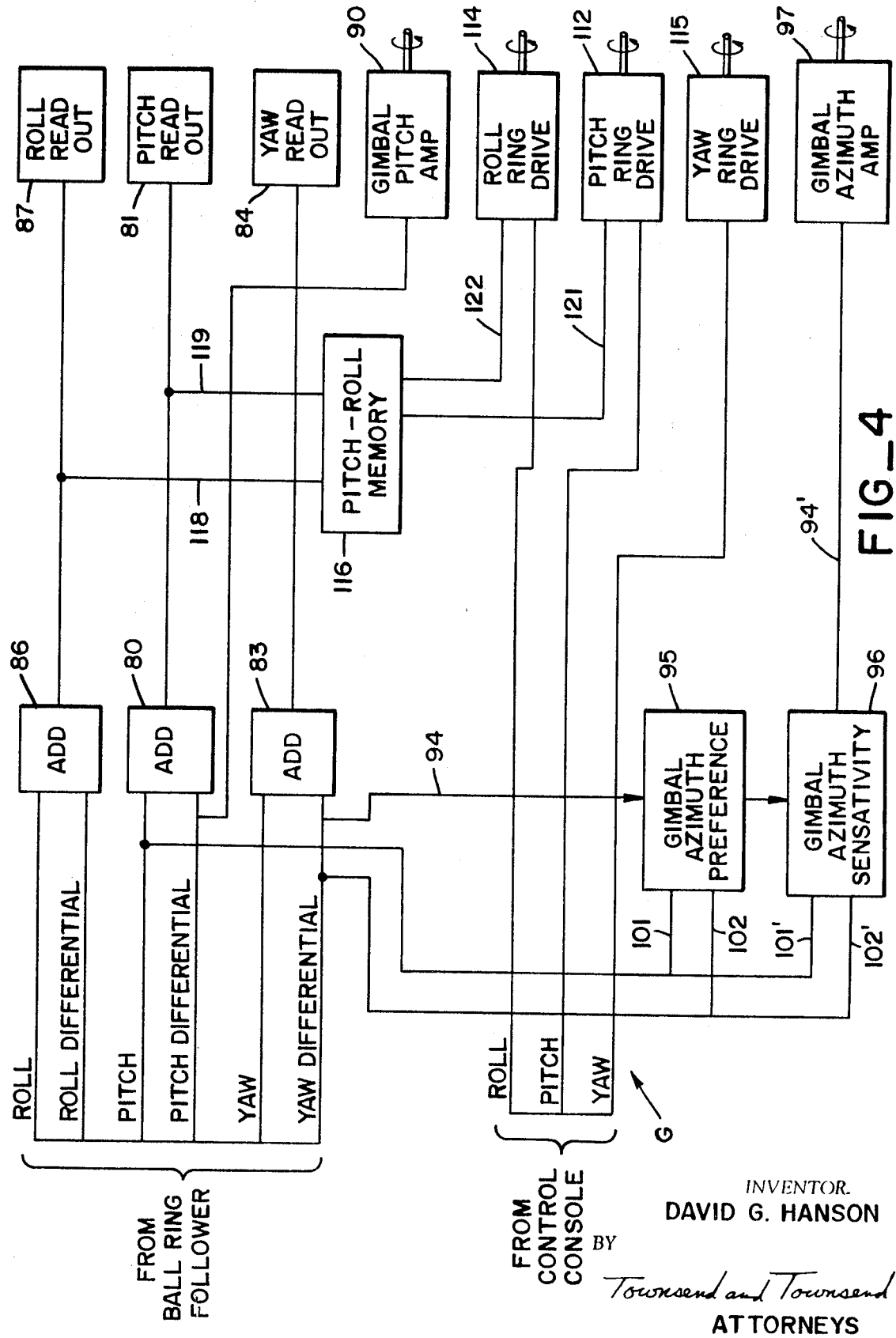

3,611,785
SPHERICAL AIR BEARING TEST CARRIAGE HAVING UNLIMITED ANGULAR MOTION
David G. Hanson, Los Altos, Calif., assignor to Carco Electronics, Menlo Park, Calif.
Filed Apr. 14, 1969, Ser. No. 815,564
Int. Cl. G01c 25/00; F16m 11/14
U.S. Cl. 73—1                    14 Claims

ABSTRACT OF THE DISCLOSURE

A guidance system test carriage is mounted on a bearing ball supported by air within a socket to provide unlimited carriage roll and limited table movement in pitch and yaw relative to the socket. The socket is in turn supported on a motored gimbal mounting. Sensors between the ball and socket detect small movements of the carriage in pitch and yaw and move the motored gimbal mounting and its attached socket to follow carriage in pitch and yaw providing unlimited angular carriage motion.

---

This invention relates to a test carriage for inertial guidance and control devices and more particularly sets forth a test carriage which provides substantially frictionless and unrestricted motion in roll, pitch and yaw.

With the development of precision inertial guidance systems there has grown a need for test carriages capable of emulating in a laboratory environment the substantially free and weightless inertial conditions existing in space. These inertial conditions include complete freedom in roll, pitch and yaw. Typically an element to be tested is mounted to a supporting carriage. The tested element either provides its own rotational force by such apparatus as small reactive jets or alternately is set in motion by an outside force acting directly on the test element. The function of the carriage is to support the test element and simultaneously permit angular motion so that any error or construction in the test element can be detected and corrected before the test element is subjected to actual orbital space flight.

Conventional test carriages have heretofore been unable to provide complete freedom in pitch, roll and yaw. These tables typically have unlimited motion only in roll or pitch or yaw. The limited components of angular motion, commonly in pitch and yaw, prevent the duplication of unlimited angular motion of space on such test carriages and result in guidance systems or other elements being placed into space which have not been adequately tested.

Accordingly, an object of this invention is to provide a test carriage for inertial guidance mechanisms having unlimited movement in pitch, roll and yaw. A ball and socket bearing support provide a test carriage with unlimited motion in roll and limited movement in pitch and yaw. The socket is mounted on a servomotored gimbal mounting and adapted to follow small movements of the carriage in pitch and yaw so that the carriage is provided with unrestricted angular motion.

A further object of this invention is to provide a combination test carriage and gimballed supporting base which together permit a test element to move in unrestricted angular motion without physical interference or obstruction limiting such motion.

An advantage of this invention is that it provides a test carriage for an inertial guidance device which is effectively free of gravity caused restraints and can duplicate to the maximum extent the substantially unrestrained free environment existing in space flight.

A still further object of this invention is to couple a substantially friction-free ball and socket test carriage support with a simplified servo-follower system which will enable rapid tracking of the socket relative to small movements of the ball in pitch and yaw.

Yet another object of this invention is to compensate a test carriage system against minute unbalance torques on the test carriage system caused by the elastic deflection of the tested element under the forces of the earth's gravitational field.

A further object is to provide a spherical air bearing test carriage with a continuous reading of roll, pitch and yaw over the unlimited range of motion provided by this invention.

A still further object of this invention is to provide an apparatus for initially positioning the test carriage prior to, and during a test.

Other objects, features and advantages of the present invention will be more apparent after referring to the following specification and attached drawings in which:

FIG. 1 is an elevation view of the test carriage system with the roll axis of the carriage supports vertically aligned and the bearing ball shown in broken lines interior of the supporting and following gimbal mounted socket;

FIG. 2 is an enlarged side elevation section showing the supporting socket broken away to illustrate the relative positions of the bearing ball, sensor ring and socket for following changes of the carriage spin axis in elevation from a vertical attitude towards a horizontal attitude;

FIG. 3 is an enlarged plan section showing the supporting socket broken away to illustrate the relative positions of the bearing ball, sensor ring and socket for following changes of the carriage spin axis in azimuth from a first horizontal alignment of the spin axis to a second, clockwise rotated horizontal alignment of the spin axis in azimuth;

FIG. 4 is a block diagram of a control mechanism suitable for receiving signals from a sensor ring and relaying actuating signals to the motored gimbal mounting as well as compensating for system unbalance due to the presence of the ambient gravitational field; and, FIG. 5 is a plan section of the bearing ball taken normal to the spin axis showing the sensor and motor mechanisms between the ball and sensor ring.

With reference to FIGS. 1 and 2, test carriages A are shown attached to either pole of supporting ball bearing B maintained within socket C. As supported within socket C, ball B has unlimited roll about an axis 14 and limited pitch and yaw. Socket C is in turn connected to gimbal mount D, which mount is capable of orienting supporting socket C to any attitude of pitch and yaw providing unlimited angular motion of the tables A and their supported load.

As shown specifically in FIGS. 2 and 3, socket C and ball B are interconnected by sensor ring E. This sensor ring, riding on ball B at one portion and connected by a gimbal mount to socket C at another portion contains sensors F for communicating to servo-circuitry G (shown schematically in FIG. 4), the changes in pitch and yaw of the ball relative to the socket. These pitch and yaw changes are amplified and in turn communicated to motors moving gimbals D, which motors move socket C in following relation to the movements of ball B in pitch and yaw.

Test carriages A are mounted to and supported by bearing ball B at either end of the polar axis 14. These carriages provide surfaces to which the tested inertial guidance system can be mounted. Typically, the carriages are mounted normal to the polar axis 14 about which ball B is free to roll interior of socket C. Further, carriages A are mounted to opposite poles of ball B. This enables the carriages to be loaded by the tested equipment so that the center of gravity of the attached load, carriages A, and ball B coincides with the center of ball B. This coincidence of the center of gravity of ball B with the center of the ball eliminates any pendulous unbalance of the tested element about the pivot provided by the ball and socket bearing and effectively duplicates the weightless condition of an orbiting vehicle within the earth's gravitational field.

Preferably, carriages A are provided with an interconnecting passage 18 extending therebetween. This passage serves to provide a channel through which portions of the test element mounted to each carriage can be connected by wiring, fluid lines, and the like. Additionally, passage 18 serves to reduce the weight, and inertial moment of the ball and its attached carriages A.

Ball B has a substantially perfect spherical surface 21 here shown interrupted by an equatorial extending indentation 22. An attached rim 23, configured circumferentially about the ball B in indentation 22, provides ball B with a surface whereby changes in the roll axis of the ball can be readily detected. Sensing of these changes is required to motor gimbal mount D to move socket C in following relation to changes in pitch and yaw of roll axis 14.

Carriages A are attached at necks 24 at either pole of the ball B. These necks 24 and their respective carriages A are provided with clearances permitting preselected angular motion in pitch and yaw of ball B relative to socket C (here shown as 15°).

It will be observed, that ball B as supported within socket C is provided with unlimited roll or spin about axis 14. This roll is a natural function of the spherical bearing ball B as supported within the complementary shaped socket C.

Socket C, similar to ball B, provides spherical bearing surfaces 31 complementary to and slightly smaller than the spherical surface 21 of ball B. These spherical surfaces 31 are interrupted. First, the surfaces are interrupted at the top and bottom of the socket so as to provide an aperture through which the neck 24 interconnecting the carriages A to the ball B can protrude free and clear of socket C. Further, the socket is interrupted at an equatorial circumferential interval 32. Interval 32 provides the aperture to which the sensor ring E can be gimbal mounted for detecting changes in yaw and pitch of the roll axis 14 of ball B.

Bearing surface 21 on ball B exceeds in area the corresponding bearing surface 31 on socket C. Moreover, bearing surface 31 of socket C rides medially of surface 21 of ball B when axis 14 of the ball is not inclined in pitch or yaw relative to socket C. This difference in area of the bearing surfaces and location of the socket surface 31 relative to the ball surface 21 permits the bearing interface between the ball and socket to remain essentially unchanged while the ball undergoes differing orientations of its roll axis 14 in pitch and yaw relative to socket C.

With brief reference to FIG. 3, it will be seen that socket C is provided with air manifolds 36 which in turn communicate passages 37 to the bearing interface existing between surfaces 21 of ball B and 31 of socket C. These manifolds 36 and passages 37 are in turn provided with bearing fluid under pressure so as to enable the introduction of bearing fluid between the ball and socket. The bearing fluid is typically a dry gas such as air, nitrogen, or the like provided from passages schematically shown in broken lines within the gimbal structure D.

The air bearing as existing between surface 21 of ball B and 31 of socket C is manufactured in accordance with principles well known in the art. This bearing has its inlets through passage 37 and restrictors 38, and outlets along those points where the bearing interface between ball B and socket C terminates. As pertinent to the present invention, the chosen fluid should preferably have a minimum static coefficient of friction or stiction. Moreover, the geometry of the air bearing should be such that the introduced fluid should impart to ball B no motion or "turbine torque" and should provide for a substantially frictionless motion of the ball B and the supported carriages A.

Socket C comprises two sections 41 and 42 fastened to an interconnecting ring 43 therebetween. These respective sections grip ball B therebetween so that the ball B is firmly held within the socket during all changes of pitch and yaw and cannot become detached from or fall out of the socket.

With reference to FIG. 1, gimbal mount D is illustrated. An azimuth bearing 46 with a contained azimuth motor drive 47 pivots gimbal mount D about a vertical azimuth axis 48. As used herein the "azimuth axis" refers to an axis that is fixed with respect to the apparatus but not to the element under test; because the element under test can assume virtually any position with respect to the apparatus, the pitch axis, roll axis, and yaw axis of the element under test can at any given time be co-extensive with or oblique of the azimuth axis. Attached to the upper end of azimuth bearing 46 there is a U-shaped trunnion mount or yoke 51 which supports the mounting or shaft attached to socket C at either end in trunnion bearings 52 and provides through a bearing pitch drive 53 for rotation of socket C about a pitch axis 54. As azimuth axis 48 intersecting yoke 51 at the web thereof and pitch axis 54 are orthogonal with respect to one another, it will be readily observed that socket C can be oriented to any desired alignment of pitch and yaw.

Yoke 51 has spaced vertically extending members 58 extending upwardly to trunnion bearings 52. The spacing between vertical members 58 provides an interval wherein the tested element can depend from carriages A and roll without any physical interference or obstruction occurring between the test element, socket C and gimbal structure D.

It should be apparent that gimbal D can be constructed in many differing ways. For instance, one vertical member 58 could be omitted, the remaining vertical member being of sufficient strength to support socket C, ball B and carriages A, and permitting the tested load to swing free of physical obstruction and interference with the gimbals and socket.

The orthogonal intersection between azimuth axis 48 and pitch axis 54 will be preferably coincident with the geometric center of ball B. This coincidence will prevent any translation in space of the test element when its orientation in pitch or yaw is changed.

In order that socket C may be moved in following relation relative to changes in pitch and yaw of the roll axis of ball B within socket C, it is necessary that a sensing interconnection be provided between ball B and socket C without adding restraint to the test carriage. This function is served in the present invention by sensor ring E and sensors F.

Sensor ring E is a gimbal mounted ring 64 having a U-shaped female air bearing surface 65 which rides on a rim 23 configured in ball B. Ring 64 is gimbal mounted interior of a larger support ring 68. Support ring 68 is pivotally mounted to socket C at ring pivot 71. This pivot permits both support ring 68 and gimbal mounted ring 64 to follow all movements of ball B in pitch (as shown in FIG. 2). Similarly, gimbal mounted ring 64 is pivoted interior of support ring 68 about axes orthogonal to the axis of support ring pivots 73. This interconnection permits ring 64 to follow all changes of the ball roll axis 14 in azimuth.

Ring 64 is supplied with the same lubricating fluid as ball B and socket C. Fluid passages are provided from gimbal structure D at 72. Fluid passes from gimbal D to fluid passages 73a within support ring 68. The fluid then flows to ring 64 through ring pivot 73 to a manifold 74 configured interior of ring 64. Manifold 74, having its inlet at ring pivot 73, encircles ring 64 overlying U-shaped female rim cavity 65 within the ring 64. Numerous manifold outlets extending between manifold 74 and female rim concavity 65 provides a continuous flow of lubricating fluid between the bearing interface of ring 64 and rim 23 on ball B.

Sensors F provide servomotor circuitry G with information necessary to motor socket C in following relation to ball B. Pitch sensor 76 located at trunnion bearing 52 and pitch sensor 77 located at support rim pivot 71 measure the pitch and pitch differential respectively of the roll axis 14 relative to pitch axis 54. Sensor 76 has an output which includes the pitch of socket C relative to pitch axis 54 (hereinafter called pitch) and sensor 77 has an output which includes the pitch difference between the orientation of roll axis 14 and the pitch of socket C relative to pitch axis 54 (hereinafter called pitch differential).

Likewise, there is located an azimuth sensor 78 at azimuth bearing 46 and an azimuth differential sensor 78a at support rim pivot 73 between support rim 68 and socket C. Sensor 78 has an output which is the actual azimuth of socket C relative to azimuth axis 48 (hereinafter called yaw). Sensor 78a has an output which is the difference in azimuth between the orientation of roll axis 14 and the azimuth orientation of socket C (hereinafter called yaw differential).

In order to provide complete information as to the orientation of each of the carriages A with respect to socket C, it is necessary that a roll sensor 79 be attached between ball B and gimbal mounted ring 64. The output of this sensor is the position of ball B in roll. As shown in the section of FIG. 5, this sensor is illustrated as one of the servofollower variety and has two outputs; the first output being the actual roll position of the carriages A with respect to socket C (hereinafter called roll), and the second output being the differential between the sensed roll and the new position assumed by the ball when it is undergoing motion (hereinafter called roll differential).

Having set forth the construction of the sensor ring E and the sensors F, the operation of the servomotor circuitry G illustrated in FIG. 4 can now be discussed. This circuitry has three separate functions. First, the circuitry provides a continuous reading of the roll, pitch and yaw of test carriages A. Secondly, the circuitry functions to motor socket C in following relation to movements of carriages A in pitch and yaw. Finally, the circuitry in conjunction with pitch ring drive 112 and roll ring drive 114 functions to compensate for forces of elastic deflection experienced by the tested element in the ambient gravitational field, which elastic deflection forces might otherwise cause pendulous motion of the supported test load.

Regarding the roll, pitch and yaw of carriages A, it will be realized that the instantaneous position in roll, pitch and yaw can be determined for any given moment in time. The outputs of pitch sensor 76 and 77 in pitch and pitch differential are added at integrator 80 to provide at pitch read-out 81 an instantaneous and continuous read-out of the pitch orientation of roll axis 14 of carriages A. Likewise, azimuth sensors 78 and 78a feed its paired outputs of yaw and yaw differential to azimuth integrator 83 whose signal in turn is communicated to yaw read-out 84 to provide continuous yaw information. Similarly, the paired outputs of roll sensors 79 are channeled to roll integrator 86 to provide a continuous output of roll at roll read-out 87. As is apparent, the respective outputs of read-outs 81, 84 and 87 can be continuously recorded as a function of time and other inputs into the test element so as to provide the requisite information for properly evaluating the tested inertial guidance system.

Servomotor circuitry G also functions to orient socket C in following relation to movements of the roll axis 14 of ball B in pitch and yaw. Movements of ball B in pitch, are best illustrated with respect to FIG. 2; movements of ball B in yaw, are illustrated with respect to FIG. 3.

With immediate reference to FIG. 2, it will be observed that the roll axis 14 of ball B is inclined at a clockwise angle with respect to socket C. This clockwise angular movement will produce a pitch differential output to servomotor circuitry G. This output, will in turn be channeled to gimbal pitch amplifier 90. Amplifier 90 will provide the output to pitch drive 53 necessary for orienting socket C to follow the movement of roll axis 14 of ball B. In the example illustrated in FIG. 2, socket C would be tilted the clockwise angular interval necessary to align socket C with respect to the inclined roll axis 14 of ball B.

Just as gimbal pitch drive 90 receives signals to track changes of the roll axis 14 of ball B in pitch, likewise, gimbal azimuth drive 47 must receive signals to follow changes of the roll axis 14 of ball B in azimuth. This may be illustrated with respect to FIG. 3, it being remembered that the spin axis is there illustrated in a horizontal attitude moving in a plane parallel to the angular motion provided by azimuth bearing 46 of gimbal mount D.

With reference to FIG. 3, ball B is shown with its roll axis 14 inclined in azimuth with respect to socket C. This inclination provides a yaw differential output 94. Output 94 is in turn channeled through gimbal azimuth preference circuit 95 and gimbal azimuth sensitivity circuit 96 to provide a yaw differential signal 94' to gimbal azimuth amplifier 97. In the case illustrated in FIG. 3, signals 94, and 94' would be identical. Gimbal azimuth amplifier 97 would furnish to gimbal azimuth drive 47 a signal wherein the drive would orient gimbal D and socket C to the new angular relation of roll axis 14 of ball B in azimuth. It will be noted that this movement of roll axis 14 parallel to the rotational plane of azimuth bearing 46 of gimbal D is the simplest mode of movement of roll axis 14 and ball B for socket C to follow.

Referring briefly to FIG. 1, the more complex case of gimbal movement in azimuth can be considered. It will be noted in FIG. 1, that the roll axis 14 of ball B is in parallel and coincident relation to the azimuth axis 48 of gimbals D (the offset in FIG. 1 being shown only for ease of understanding). While movements of the roll axis 14 in pitch (previously discussed with respect to FIG. 2) are relatively simple to follow, angular deflection of the roll axis in azimuth (relative to socket C) towards pitch axis 54 and from a parallel relation to azimuth axis 48 will present two problems. First, gimbal rotation about azimuth bearing 46 will be indeterminate in trying to follow the movement of roll axis 14. Gimbal 46 could rotate 90° in either a clockwise or counterclockwise direction to follow the new movement of the roll axis 14. Additionally, small movements of the roll axis 14 away from its parallel relation to the azimuth axis 48 of the gimbals D will produce large movements of the gimbal to align to the new azimuth inclination of roll axis 14. Assuming that there is a continuous small movement of roll axis 14 relative to the azimuth axis 48 of the gimbals D, continuous violent movement of gimbals D in azimuth could be anticipated unless provision was made to overcome such movement. Gimbal azimuth preference circuitry 95 and gimbal azimuth sensitivity circuit 96 overcome these tendencies.

Gimbal azimuth preference circuit 95 has two inputs; a pitch input 101 which detects when roll axis 14 is near a parallel relationship to azimuth axis 48 and a yaw differential input 102 which detects when movement of the roll axis 14 towards pitch axis 54 occurs. Assuming that circuit 95 detects that roll axis 14 is in parallel relation to azimuth axis 48, gimbal azimuth preference circuit 95 is activated. When a yaw differential is detected and channeled to the activated circuit through input 102, the preference circuit 95 provides gimbal azimuth amplifier 97 with a signal in a preselected direction so that turning of the gimbal azimuth drive 47 will no longer be indeterminate but will occur in a given and chosen azimuth direction.

Gimbal azimuth sensitivity circuit 96 has two inputs identical to preference circuit 95. Sensitivity circuit 96 has a first input 101' which activates the circuit when roll axis 14 is parallel to the azimuth axis 48 of the gimbal D. When circuitry 96 is activated, it remains only for minute movement of the roll axis 14 away from its parallel relation to azimuth axis 48 and towards pitch axis 54 to be detected. Such an input is provided at 102′ from the yaw differential signal. Upon receiving these simultaneous signals at input 101′ and 102′, gimbal azimuth sensitivity circuit 96 functions to reduce the gain on gimbal azimuth amplifier 97. This gain reduction prevents violent movement of gimbals D in azimuth responsive to small angular changes or wobbles of roll axis 14.

It will be remembered that in order for tables A and ball B to be loaded so that pendulous motion of the tested load relative to socket C was eliminated, it was necessary that the center of gravity of the test load, carriages A and ball B coincide with the pivot center of the ball and socket bearing. This coincidence functioned to completely eliminate any pendulous motion of the ball, carriages and test load as supported within socket C and duplicates within the ambient gravitational field the free and weightless conditions of space flight.

Unfortunately, loads tested in an ambient gravitational field or fields frequently undergo minute elastic deflection. This deflection causes the center of gravity of the test load to move from a position of coincidence with the spherical center of ball B to a new position offset from the center of the ball. As offset from the center of the ball, the supported test element experiences a minute pendulous force as it pivots on ball B and socket C. Such forces of unbalance occur when roll axis 14 is not in parallel relation to azimuth axis 48. Moreover, due to the section of the test load, these minute elastic deflections due to gravitational loading of the test load frequently change as the load rolls about roll axis 14 of ball B.

The present invention provides for compensation of these deflection forces by providing ball B with compensating forces equal and opposite to the pendulous forces generated by the elastic deflection. These compensating forces are exerted through pitch drive 112 (a small electric sensor and rotor) between support ring 68 and socket C and roll drive 114 (here shown as an encircling stator line 114a and rotor 114b shown in FIG. 5) between ring 64 and ball B. The magnitude of the respective forces is in turn determined through a roll pitch memory 116 (shown in FIG. 4). Memory 116 has as inputs the roll at 118 and pitch at 119 of the tested load.

In understanding the compensation of the elastic deflection of the test load, it will be appreciated that gimbal D is preferably mounted so that azimuth bearing 46 rotates the socket C normal to the gravitational field. With such an orientation of azimuth bearing 46, changes of the test load in azimuth will produce no appreciable elastic deflection of the tested inertial guidance device. However, movements of the guidance device to predetermined positions of pitch or roll will produce elastic deflection.

Pitch roll memory 116 is provided with a memory which retains the pendulous forces of unbalance for all positions of roll and pitch of the test element. Inputs 118, providing the roll of the tested load and 119, providing the pitch of the tested load are compared to this memory. When the comparison is made, pitch drive 112 and roll drive 114 are supplied with electrical power which generates on ball B through ring 64 forces equal and opposite to the pendulous unbalance created by elastic deflection of the tested element. The electrical power operates between two rotor and stator of each of the drives 112 and 114 to cause minute mechanical forces to be exerted in roll and pitch which are equal and opposite to the forces in roll and pitch modes caused by the elastic deflection.

In addition to the compensation for the gravitational deflection of the test load, it is often desired to initially position the test carriage prior to, or during a test. This initial positioning is accomplished by pitch ring drive 112, roll drive 114, and yaw ring drive 116.

As shown in FIG. 4, typically the test carriage is provided with a control console (not shown). This control console has master controls for supplying initial signals in roll, pitch and yaw to roll ring drive 114, pitch ring 112, and yaw ring drive 115. Connections are typically provided to these drives and are schematically shown on the drawing. Typically, the desired aspects of pitch, roll and yaw are set into the test carriage at the control console. Thereafter, drives 112, 114 and 115 position the carriage to provide the desired initial aspect in pitch, roll and yaw.

Because of the near perfect balance of the test element and carriage, the power output of the drives 112, 114 and 115 are usually of low power, it being understood that the power requirements can be altered for faster movement.

It should be appreciated that a test carriage according to this invention could be constructed with alternate configurations of the ball and socket bearing here illustrated. For instance, ball B could be connected to gimbal mount D and socket C to the test load.

What is claimed:

1. Apparatus for emulating on a test element to be tested the unlimited angular motion in roll, pitch, and yaw of orbital space flight, comprising: a carriage for said test element; a ball and socket bearing combination having a ball section and a socket section embracing said ball section, said carriage being connected to one of said sections; a shaft connected to the other said section so as to provide unlimited roll and limited pitch and yaw of said carriage relative to said shaft from a preselected position with respect to said shaft; a gimbal support connected to said shaft, said gimbal support being rotatable on an axis perpendicular to the axis of said shaft to selectively position said shaft on said pitch axis, said yaw axis, and positions intermediate said pitch and yaw axes whereby said shaft can have angular movement through more than 360 degrees of yaw and pitch; sensor means between said ball section and said socket section to sense the deviation of said carriage relative to said shaft in pitch and yaw from said preselected position to produce error signals proportional to said deviation; and motor drive means connected to said gimbal support responsive to said error signals developed by said sensor means to rotate said gimbal support to positions which will allow said carriage to return to said preselected position with respect to said shaft while retaining said carriage supported about a fixed position in space.

2. The invention of claim 1 and wherein said sensor means includes: a rim mounted to the ball of said ball and socket bearing; a sensor ring adapted to ride on said rim for following movements of said ball in pitch and yaw relative to said socket; a gimbal mount connecting said ring to said socket of said ball and socket bearing, said gimbal mount including sensors for detecting the pitch and yaw of said ring with respect to said socket.

3. The invention of claim 1 and including: a pair of carriages for supporting said test element; said carriages attached to the ball of said ball and socket bearing at opposite poles thereof; said socket including openings permitting said carriages to protrude out from said ball free of said socket permitting unlimited roll and limited pitch and yaw of said carriages relative to said socket.

4. The invention of claim 1 and wherein said gimbal support includes a pair of pivots, each of said pivots providing unlimited rotational movement about orthogonally intersecting axes.

5. The invention of claim 1 and wherein said gimbal support is attached to define about said ball and socket bearing a spatial interval for unrestricted movement of said test element in roll, pitch and yaw.

6. In combination: a carriage for supporting an element to be tested; a mounting for supporting said carriage; a ball and socket bearing between said carriage and said mounting with said carriage connected to said ball and said mounting connected to said socket; said socket having opposing segments in contact with said ball at opposite hemispheres of said ball to capture said ball against relative translational movement; a gimbal support connected to said mounting and providing said mounting with angular movement through more than 360° of yaw and pitch; sensor means constructed and arranged to sense the deviation of said carriage relative to said mounting in pitch and yaw from an axis normal to the pitch axis of said mounting and adapted to produce error signals proportional to said deviation; and motor drive means connected to said gimbal support responsive to said error signals developed by said sensor means to move said mounting to a position which will allow said carriage to assume any angle with respect to said pitch and yaw axes.

7. The invention of claim 6 and wherein a second carriage for supporting said test element is attached to the ball of said ball and socket bearing, the two carriages being attached at opposite poles of said ball and said socket includes openings at corresponding poles for permitting said carriages to protrude outwardly from said ball and free of said sockets for permitting said carriage to move in unlimited roll and limited pitch and yaw relative to said socket.

8. The invention of claim 7 and wherein said ball and attached carriages define a passageway therethrough for communicating portions of said test element attached to each said carriage.

9. In combination: a two section ball and socket bearing providing unlimited roll and limited pitch and yaw of the ball of said bearing with respect to the socket of said bearing, said roll, pitch and yaw occurring about respective mutually perpendicular axes, said ball maintained in said socket by opposing segments of said socket, each segment of said socket being complementary to the other socket segment and contacting said ball at opposite hemispheres of said ball; a mounting connected in supporting relation to one section of said ball and socket bearing; a carriage mounted to the other section of said ball and socket bearing; a gimbal connected to said mounting to support said mounting for angular movement through more than 360° so that said mounting can assume any position in a plane defined by the axes of yaw and pitch; a test element, said test element being mounted to said carriage so as to establish the center of gravity of said carriage, bearing and test element coincident with the center of said ball and socket bearing; sensor means constructed and arranged to sense the deviation of said carriage relative to said mounting in pitch and yaw from a preselected position of alignment in a plane normal to the roll axis to produce error signals proportional to said deviations; and motor drive means connected to said gimbal support responsive to said error signals developed by sensor means to move said gimbal support to positions which will allow said carriage to return to said preselected position of alignment.

10. The combination of claim 9 and including memory means connected to said sensor means for retaining force of pendulous unbalance for all aspects of said carriage and test element in pitch and roll; emitting means mounted to said memory means for providing deviation signals proportional to the retained forces of pendulous unbalance of said memory means for the detected pitch and roll aspect of said test element; motor means between said ball and socket communicated to said emitting means for exerting torques therebetween equal and opposite to the pendulous forces of elastic unbalance of said test element in pitch and roll.

11. An inertial test table comprising: a yoke, bearing means mounted at the web of said yoke for rotating said yoke freely through 360°, a mounting extending between the legs of said yoke, bearing means rotatably supporting said mounting for rotation through more than 360°, a socket mounted on said mounting, a ball mounted in said socket for limited motion throughout approximately plus or minus 15° from a predetermined neutral position; two test element carriages; support means mounted on said ball having said test element carriage mounted on opposite poles thereof, sensing means constructed and arranged to sense the deviation from the fixed predetermined neutral position of said carriage with respect to said mounting to produce error signals proportional to deviation from said neutral position; a first motor connected to said mounting to rotate said mounting in pitch upon actuation, a second motor connected to said web to rotate said web in yaw upon actuation, and means constructed and arranged to operate said first and second motors in response to said error signals developed by said sensor means to cause said first and second motors to move said mounting and said yoke to positions which will allow said ball and socket to be returned to the fixed predetermined position while retaining said test element in a fixed position in space.

12. The invention of claim 11 and wherein said sensing means is constructed and arranged to sense the deviation of said ball with respect to said socket.

13. Apparatus for detecting the deviation of a ball relative to a mating socketing in pitch and yaw comprising: a rim attached to said ball; a sensor ring sliding on said rim for following movements of said ball in pitch and yaw and permitting roll of said ball within said ring; a gimbal mount connecting said ring to said socket and including sensors for detecting the pitch and yaw of said ring with respect to said socket.

14. Apparatus for supporting a test element for movement about a roll axis and about a pitch axis perpendicular to said roll axis and about a yaw perpendicular to said roll and pitch axes, said apparatus comprising a gimbal supported for rotation on said roll axis, a shaft mounted on said gimbal for rotation about an axis in a plane perpendicular to said roll axis, means for rotating said gimbal to selectively position said shaft on said pitch axis, said yaw axis, and positions intermediate said pitch and yaw axes, a ball and socket bearing combination having a ball section and a socket section embracing said ball section, one of said sections being connected to said shaft, the other section having limited angular movement relative to said one section, a carriage for mounting said test element connected to the other said section of said ball and socket bearing connection so that said test element can experience limited movement about said pitch and yaw axes, means operatively connected to said ball and socket bearing combination for sensing the angular movement of said test element about said pitch and yaw axes, and means responsive to said sensing means for rotating said gimbal about said roll axis to position said shaft perpendicular to the resultant of movement about said pitch and yaw axes.

References Cited

UNITED STATES PATENTS

| | | | |
|---|---|---|---|
| 732,258 | 6/1903 | Belyen | 33—73 (D) |
| 2,086,897 | 7/1937 | Carter et al. | 33—204 (2) |
| 3,164,978 | 1/1965 | Sharman et al. | 73—1 (E) |
| 3,309,931 | 3/1967 | Adams et al. | 74—5.6 |
| 3,387,482 | 6/1968 | Wilcock et al. | 73—1 (D) |

LOUIS R. PRINCE, Primary Examiner

W. A. HENRY II, Assistant Examiner

U.S. Cl. X.R.

74—5.6; 248—184; 308—9